Ino S. Coffman. Rotating Crane.
72801
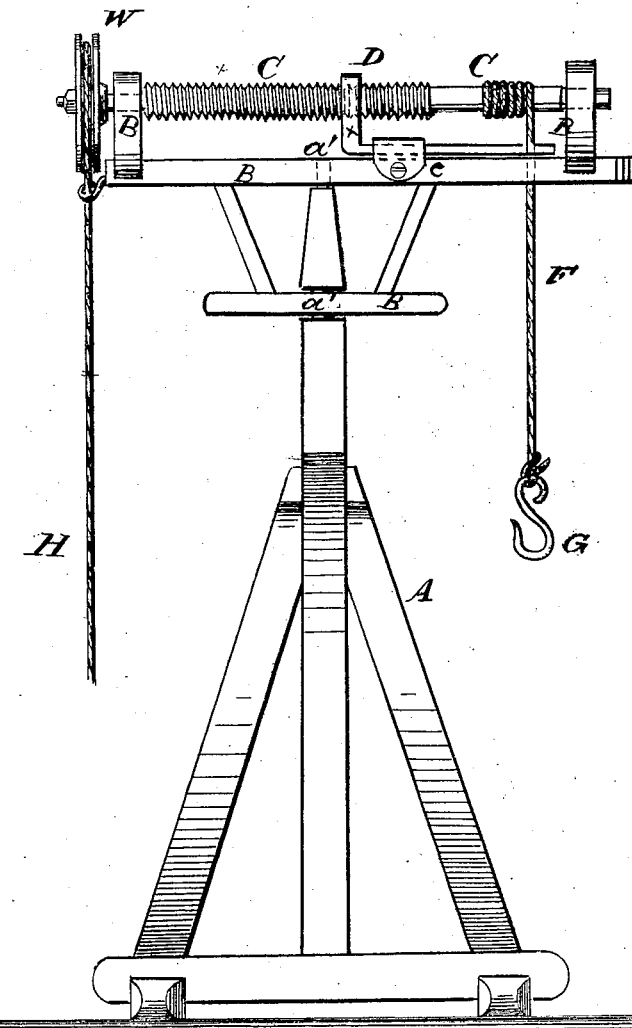
PATENTED
DEC 31 1867
Witnesses.
Theo Tische
Wm Trevrin
Inventor:
J. S. Coffman
Per
Attorneys

United States Patent Office.

JOHN S. COFFMAN, OF GREENVILLE, INDIANA.

Letters Patent No. 72,801, dated December 31, 1867.

---

IMPROVED ROTARY CRANE.

---

*The Schedule referred to in these Letters Patent and making part of the same.*

---

TO ALL WHOM IT MAY CONCERN:

Be it known that I, JOHN S. COFFMAN, of Greenville, in the county of Floyd, and State of Indiana, have invented a new and improved Rotating Crane; and I do hereby declare that the following is a full, clear, and exact description thereof, which will enable others skilled in the art to make and use the same, reference being had to the accompanying drawings, forming part of this specification.

This invention relates to a new and improved method of constructing cranes or derricks, whereby the same are more easily manipulated, and more simply and economically constructed.

It consists of a frame or stand, on the top of which are a revolving windlass and windlass-frame, around the axle of which windlass is the cord or rope by means of which merchandise is raised.

The drawing represents a front view of the stand, windlass, and frame.

A is the stand; B is the windlass-frame; C is the axle of the windlass, having upon it a screw-thread; D is a nut, through which the axle C passes, moving on the frame B in the guide $e$; F is the cord or rope, by means of which goods are raised; G is a hook on the end of rope F, by which merchandise is attached to rope F; $a'$ are pivots, upon which frame B rotates; W is the wheel by which the axle C is turned by means of the endless cord or rope H. The stand A consists of a tripod, of sufficient height for the purposes wanted, upon the top of which is pivoted the windlass-frame B by the pivots $a'$. In the frame B, upon bearings, as shown in the drawings, turns the axle C, to one end of which is the grooved wheel or pulley W. Upon said axle C is a screw-thread, which fits into the nut D. The nut D is so constructed as to slide upon the frame B, by means of an arm attached to the said nut D. In the end of the arm of said nut is a hole, and corresponding with said hole there is, in the frame B, a slot through which passes the cord or rope F, and by means of which said hole the rope F is so guided as not to be wound upon itself, upon the axle C, but be laid evenly and smoothly upon said axle C. The rope F is attached by one end to the axle C, and to the other end of the same is attached the hook G. An endless rope or cord, K, passes over the wheel or pulley $w$, in the groove in the same, by means of which the wheel W and axle C are made to turn in either direction, and the rope F wound upon the axle C, or unwound from the same. The frame B rotates upon the stand A, so that the end of the axle C, which is attached the hoisting-rope F, will describe a circle around the centre $a'$.

The operation is such that by turning the axle C, the nut D is moved along on the frame B, and said nut D having a hole through the arm attached to the same, through which the rope F passed the same, is guided along the axle C, and wound evenly upon the same.

Said crane or derrick may be made of wood, or wood and metal combined, and, as above described, constitutes a cheap, durable, and reliable elevating or hoisting-apparatus, and one which is easily manipulated.

I claim as new, and desire to secure by Letters Patent—

1. The axle C, having on it a screw-thread and the nut D, as a guide for the rope F, substantially as shown and described, and for the purposes set forth.

2. The rotating windlass-frame B, in combination with the wheel W, axle C, nut D, and stand A, substantially as shown and described, and for the purposes set forth.

JOHN S. COFFMAN.

Witnesses:
 GEORGE COFFMAN,
 JAMES TAYLOR.